United States Patent [19]

Ryuto et al.

[11] Patent Number: 4,911,521
[45] Date of Patent: Mar. 27, 1990

[54] CONNECTING BOX FOR MULTI-OPTICAL FIBER CABLE

[75] Inventors: Masahiro Ryuto, Kanagawa; Shoichiro Nishimura, Osaka, both of Japan

[73] Assignees: Sumitomo Electric Industries, Ltd.; The Kansai Electric Power Co., Ltd., both of Osaka, Japan

[21] Appl. No.: 307,491

[22] Filed: Feb. 8, 1989

[30] Foreign Application Priority Data

Mar. 15, 1988 [JP] Japan .................................. 63-62295

[51] Int. Cl.$^4$ .............................................. G02B 6/36
[52] U.S. Cl. .................................................. 350/96.20
[58] Field of Search ................ 350/96.20, 96.21, 96.22

[56] References Cited

U.S. PATENT DOCUMENTS 4,708,430 11/1987 Donaldson et al. .............. 350/96.20
4,792,203 12/1988 Nelson et al. ..................... 350/96.20

Primary Examiner—Frank Gonzalez
Attorney, Agent, or Firm—Cushman, Darby & Cushman

[57] ABSTRACT

A connecting box for multi-optical fiber cables includes a plurality of container trays each adapted to contain surplus lengths of end portions of optical fibers, the plurality of trays being stacked one upon another. Each of the trays has a pair of receptive guide portions provided respectively at its opposite ends adjacent to one of the lateral sides of the trays so that each of the receptive guide portions can receive the optical fiber. Each tray is hingedly connected to each adjacent tray at the one lateral side thereof in a releasable manner. Each tray is pivotally movable with respect to each adjacent tray about an axis extending in the direction of said one lateral side. With this construction, the portions of the optical fibers extending outwardly from each receptive guide portion are not subjected to slack even when adjacent trays are pivotally moved away from and toward each other.

9 Claims, 4 Drawing Sheets

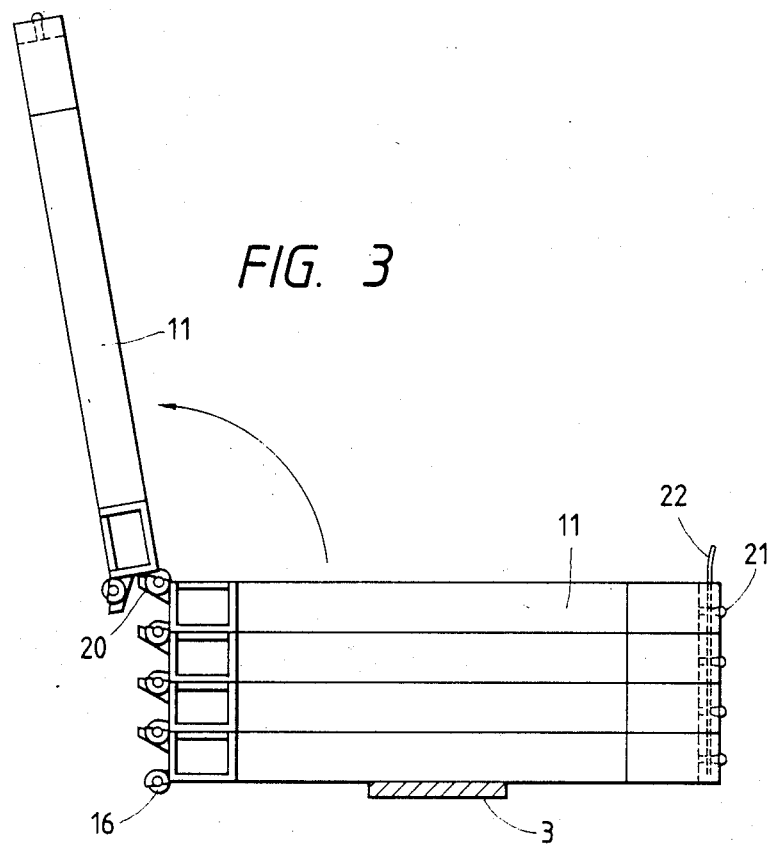
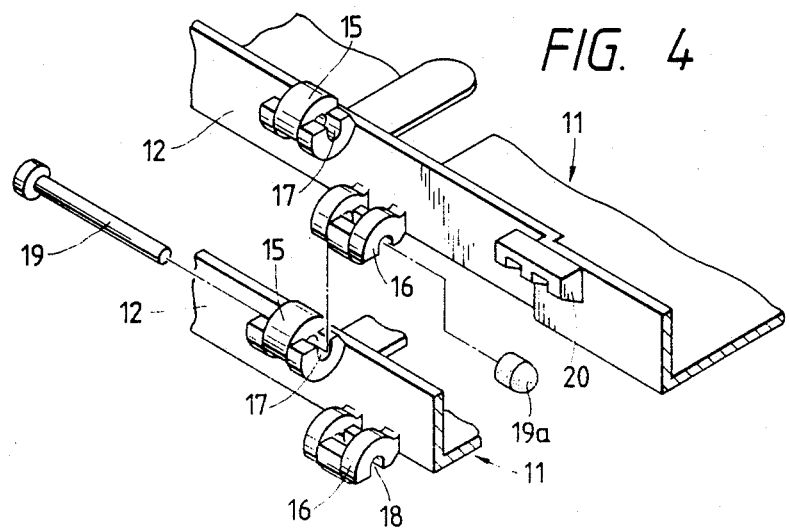

CONNECTING BOX FOR MULTI-OPTICAL FIBER CABLE

FIELD OF THE INVENTION

This invention relates to a connecting box for a multi-optical fiber cable. More particularly, this invention relates to an apparatus for connecting individual optic fibers of two or more fiber cable bundles without excess slack between the apparatus and the fiber cable bundle.

BACKGROUND OF THE INVENTION

Conventionally, in the case of the branching, the leading-in, the connecting or the like of a multi-optical fiber cable, comprising a plurality of optical fibers, a connecting box has been used to hold or contain surplus lengths of connecting end portions of optical fibers.

One conventional connecting box under consideration, shown in FIG. 5, comprises: a pair of opposed tray guides 2 and 2' mounted on a connecting plate 3 and each having vertically spaced shelves, and a plurality of container trays 1 withdrawably supported respectively on the opposed shelves of the two tray guides 2 and 2' in a stacked manner.

For connecting two multi-optical fiber cables A and A' together using this conventional connecting box, the sheaths of the two cables A and A' are first fastened respectively to the opposite ends of the connecting plate 3 by cable holders 4 and 4'. Then, the lowermost tray of the plurality of trays 1 is withdrawn from the tray guides 2 and 2' transversely of the connecting plate 3, and two of the optical fibers a, extending from the sheath end of each of the cables A and A', are introduced into the lowermost tray of the plurality of trays 1. The optical fibers a of the cable A are connected respectively to the optical fibers a of the cable A' at their distal ends by means of connectors 5. A surplus length b of each optical fiber a is formed into a loop and is contained in the lowermost tray. Then, the lowermost tray is pushed back into the tray guides 2 and 2'. Thus, the connecting operation with respect to the lowermost tray 1 is completed. Then, the next lowermost tray of the plurality of trays 1, disposed immediately above the lowermost tray, is withdrawn and the same connecting operation is carried out. The operation continues for any number of optic fibers and any number of trays. In this manner, the connection between the other optical fibers a of the cables A and A' is made according to the same procedure.

With this construction, however, when the tray 1 is pushed into the tray guides 2 and 2', after the connection between the optical fibers a of the multi-optical fiber cables A and A' as well as the formation of the surplus lengths b of optical fibers a into a loop are made in the withdrawn condition of the tray 1, that portion c of each optical fiber a extending between the cable holder 4 and the end of tray 1 becomes loosened or slacked, so that the portion c tends to be formed into a loop having an arcuate portion of a small radius of curvature, as shown in FIG. 6.

The presence of such an arcuate portion of a small radius of curvature in the optical fiber will adversely affect its transmission characteristics.

Another disadvantage of the conventional connecting box is that once the tray 1 is pushed into the tray guides 2 and 2', the surplus lengths of optical fibers contained in the tray cannot easily be inspected.

SUMMARY OF THE INVENTION

It is therefore an object of this invention to provide a connecting box for a multi-optical fiber cable which will not affect the transmission characteristics of the optical fibers and allows easy access to the optical fibers contained in the container trays.

According to the present invention, there is provided a connecting box for connecting two multi-optical fiber cables together. The box comprises a plurality of container trays each adapted to contain a surplus length of an end portion of at least one optical fiber of each of the two cables, the plurality of trays being stacked one upon another. Each of the trays has opposite ends and opposite lateral sides and has a pair of receptive guide portions provided respectively at its opposite ends adjacent to one of the lateral sides thereof so that each of the receptive guide portions can receive the optical fiber of a respective one of the two cables. Each adjacent pair of trays of the plurality of trays are hingedly connected together along one lateral side thereof in a releasable manner so that adjacent trays are pivotally movable with respect to each other about an axis extending in the direction of the one lateral side.

Since adjacent trays are hingedly connected together along one lateral side so as to be pivotally movable with respect to one another, the connecting portions of the optical fibers contained in each of the trays are easily accessible, which facilitates the maintenance and repair of these connecting portions. In addition, the portions of the optical fibers extending outwardly from each receptive guide portion are substantially unchanged in length; that is, kept almost constant, even when one or more of the trays are pivotally moved, since the axis of this pivotal movement is disposed along and close to the one lateral side of the tray adjacent to which the pair of receptive guide portions are provided. Therefore, the portions of the optical fibers extending outwardly from the receptive guide portion are not subjected to slack and hence are positively prevented from being formed into an arcuate shape or a circular shape having a small radius of curvature. Therefore, the transmission characteristics of the optical fibers will not be affected by such slack in the fibers.

In accordance with these and other objects which will become apparent, the present invention will be described with particular reference to the accompanying drawings.

BRIEF DESCRIPTION OF THE DRAWINGS

FIG. 3 is an end view of the connecting box, with an uppermost container tray 11 shown as held in its open position;

FIG. 4 is a fragmentary, enlarged perspective view of the trays of the connecting box;

DESCRIPTION OF THE PREFERRED EMBODIMENT

Figure 1:
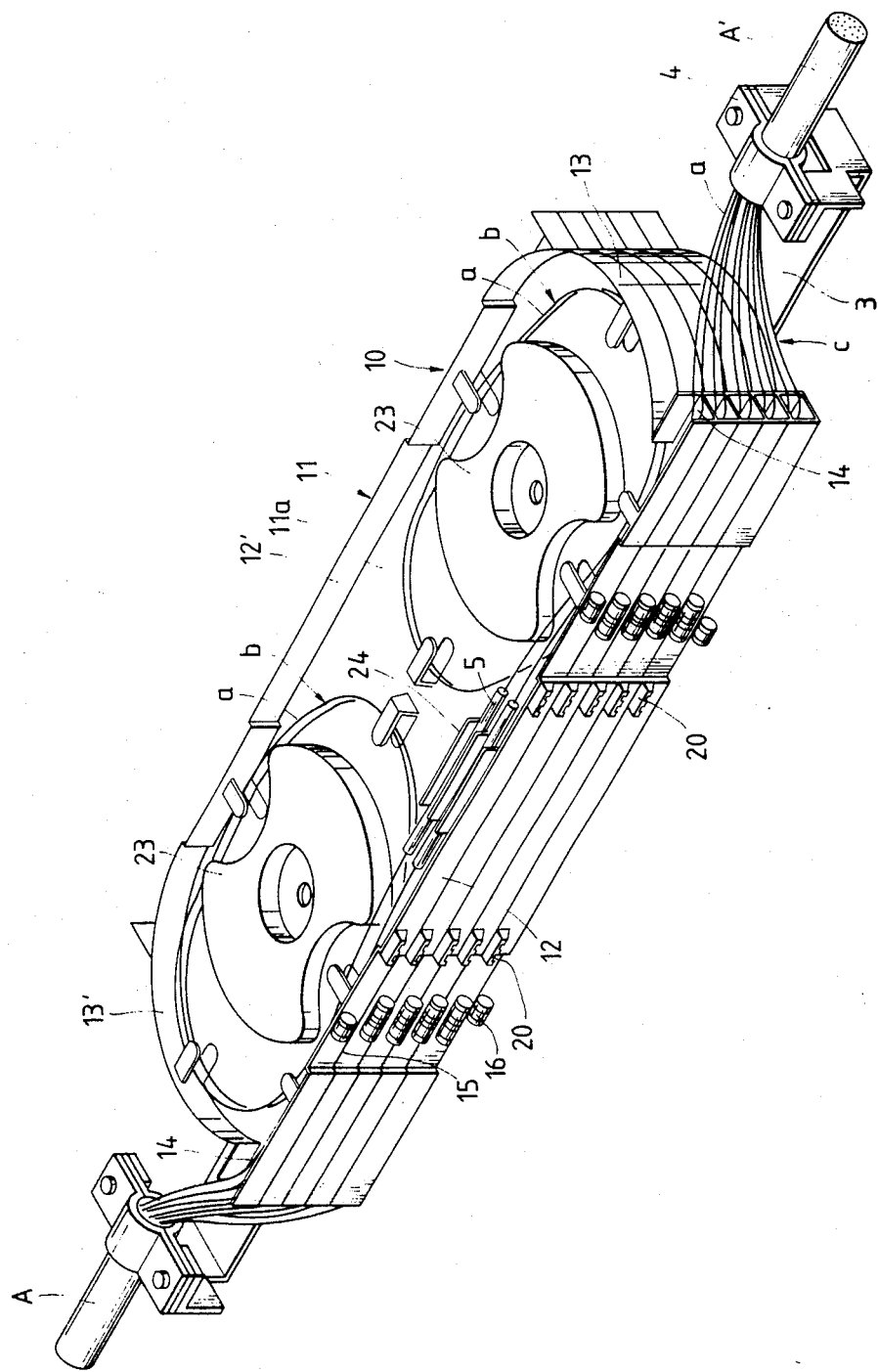
FIG. 1 is a perspective view of a connecting box provided in accordance with the present invention, which is dispose between two multi-optical fiber cables to connect them together.
Figure 2:
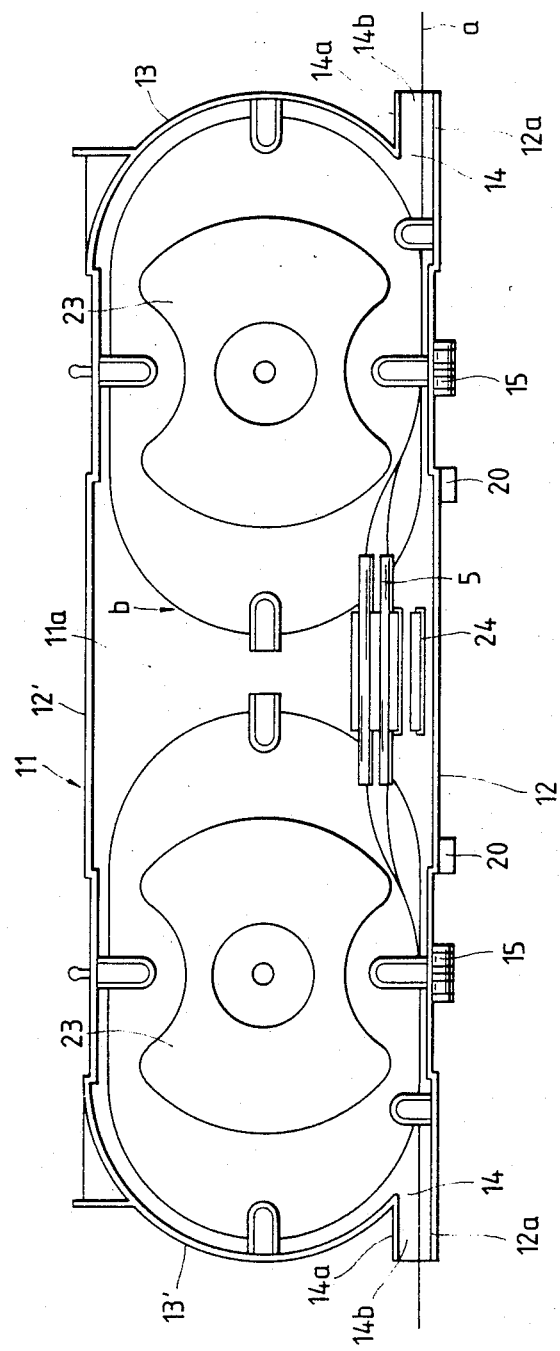
FIG. 2 is a top plan view of the connecting box.
Figure 5:
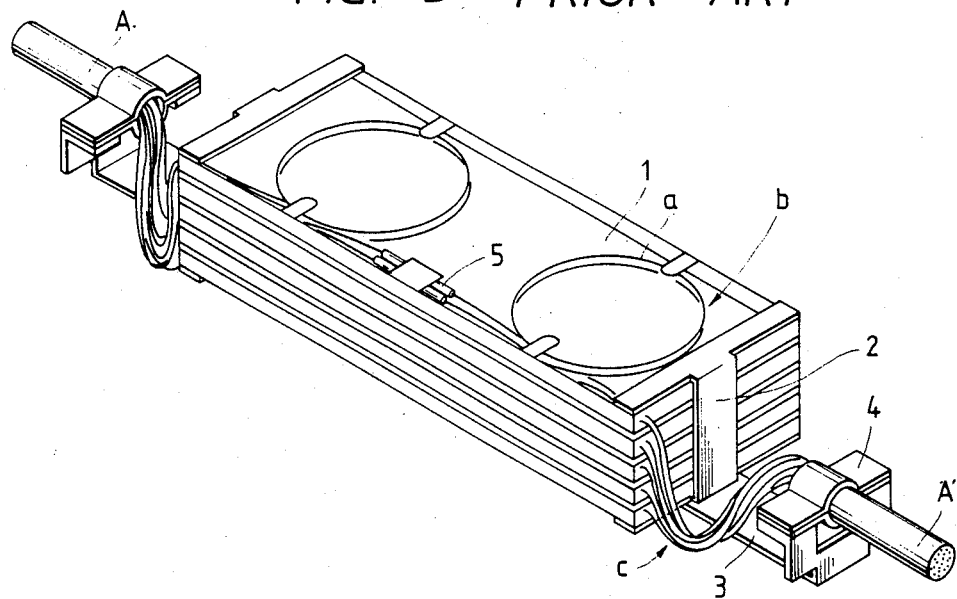
FIG. 5 is a perspective view of a connecting box provided in accordance with the prior art.
Figure 6:
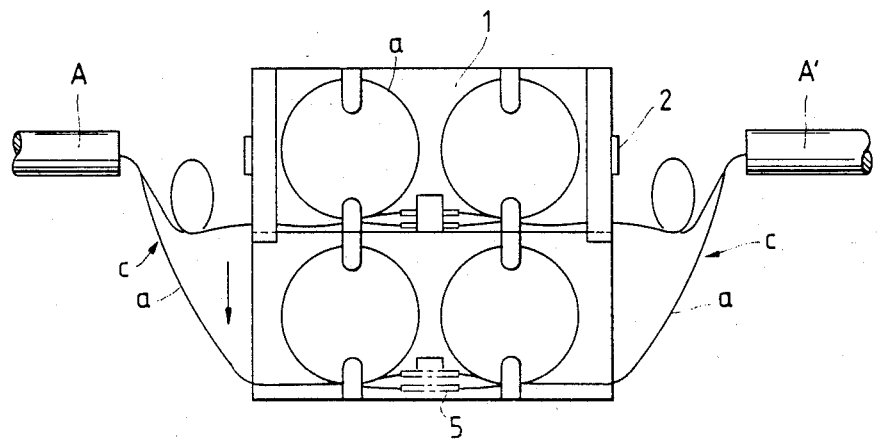
FIG. 6 is a top plan view of the connecting box of FIG. 5, with one container tray shown in a withdrawn condition.

The invention will now be described with reference to FIGS. 1 to 4.

A connecting box 10 according to the present invention comprises a plurality of container trays 11 of an identical shape. Each tray 11 includes a container-like body with an open top. The tray body is made of a rigid sheet or plate and has a flat base plate or portion 11a of a generally rectangular shape having opposite rounded ends, a pair of opposed side walls 12 and 12' formed on and extending along opposite lateral side edges of the base portion 11a, respectively, in perpendicular relation to the base portion 11a, and a pair of opposed, arcuate end walls 13 and 13' formed on the opposite rounded ends of the base portion 11a and disposed in perpendicular relation to the base portion 11a. A receptive guide portion 14, of a channel-shaped cross-section for receiving optical fibers, is formed at one side of each of the end walls 13 and 13'. The receptive guide portion 14 is defined by an end portion 12a of the side wall 12, an inner wall 14a disposed in parallel opposed relation to the end portion 12a, and a bottom wall 14b interconnecting the end portion 12a and the inner wall 14a at their lower ends and disposed in coplanar relation to the base portion 11a.

Two pairs of upper and lower bearings 15 and 16 are formed on an outer surface of the side wall 12. The two pairs, that is, the right-hand and left-hand pairs (FIGS. 1 and 2) are spaced from each other in the direction of the length of the side wall 12. Each upper bearing 15 is disposed adjacent to the upper edge of the side wall 12 while each lower bearing 16 is disposed adjacent to the lower edge of the side wall 12. When the plurality of trays 11 are stacked one upon another in position, the right-hand (left-hand) upper bearing 15 of each tray 11 is disposed in line with the right-hand (left-hand) lower bearing 15 of its upper adjacent tray 11 in contiguous relation thereto, with a bearing aperture 17 of the upper bearing 15 aligned with a bearing aperture 18 of the lower bearing 16. A pivot or hinge pin 19 is passed through the thus aligned apertures 17 and 18 of the upper and lower bearings 15 and 16 of the two adjacent trays 11 to hingedly connect them together. In this manner, the two accent trays 11 can be pivotally moved relative to each other about the two pivot pins 19 passing through the aligned right-hand bearings 15 and 16 and the aligned left-hand bearings 15 and 16, respectively. An end cap 19a is detachably fitted on the distal end of the pivot pin 19 to prevent the pin 19 from being disengaged from the aligned upper and lower bearings 15 and 16. Removing the end cap 19a allows the pivot pin 19 to be disengaged or withdrawn from the aligned upper and lower bearings 15 and 16.

A pair of stop lugs 20 and 20' are formed on the outer surface of the side wall 12 of each tray 1 immediately adjacent to its upper edge and spaced from each other along the length of the side wall 12. When each tray 1 is pivotally moved in its opening direction, that is, away from its lower adjacent tray, about the pivot pins 9 and 9, tee side wall 12 of this upper tray 11 is brought into engagement with the stop lugs 20 and 20' of its lower adjacent tray 11 so as to prevent a further pivotal movement of the upper tray 11. Thus, the upper tray 11 may be held by the stop lugs 20 and 20' in its open condition at a predetermined angle, for example, of 100 degrees, as shown in FIG. 3.

A pin-like connecting projection 21 is formed on an outer surface of the side wall 12' of each tray 11. In the stacked condition of the trays 11, these connecting projections 21 on the trays 11 are disposed in registry with one another in the direction of the thickness of the stack of trays 11. The trays 11 are joined together in a stacked condition against pivotal movement by a connecting band or strip 22 having a longitudinal slit releasably fitted on the connecting projections 21 disposed in registry with one another.

A pair of curvature guide portions 23 and 23' are formed on an upper surface of the base portion 11a of each tray 11 and spaced from each other along the length of the base portion 11a. A connector holder portion 24 for holding connectors 5 is also formed on the upper surface of the base portion 11a and disposed between the pair of curvature guide portions 23 and 23' adjacent to the side wall 12.

For using the connecting box 10, first, one tray 11 is fixedly secured to an elongated connecting plate 3 by suitable fastening means such as screws, so that this tray 11 constitutes the lowermost tray. Sheaths of two multi-optical fiber cables A and A', to be connected together, are fastened respectively to the opposite ends of the connecting plate 3 by cable holders 4. The optical fibers a of each of the cables A and A' have exposed end portions extending from the sheath end held by the cable holder 4.

Then, the end portions of two of the optical fibers a of each of the cables A and A' are introduced into the lowermost tray 11 through a respective one of the receptive guide portions 14. Each of he thus introduced two optical fibers a of the cable A and a respective one of the thus introduced two optical fibers a of the cable A' are connected together at their ends through the connector 5. The connector 5 is retained in position by the connector holder 24.

Then, the surplus lengths b of the end portions of the two optical fibers a of each of the cables A and A' are formed into a loop around the curvature guide 23 within the lowermost tray 11. Thus, the two optical fibers of each of the cables A and A' are contained within the lowermost tray 11.

Then, another tray 11 is stacked on the lowermost tray 11, with the upper bearings 15 of the lowermost tray 11 aligned with the lower bearings 16 of the upper tray 11, respectively, and the pivot pin 19 is passed through the aligned bearing apertures 17 and 18 of each of the two pairs of aligned upper and lower bearings 15 and 16 to pivotally connect these two trays 11 together. Then, another two optical fibers a of each of the cables A and A' are contained within the upper tray 11 adjacent to the lowermost tray 11, as described above for the lowermost tray 11.

According to the same procedure, the other trays 11 are pivotally connected one after another to provide the stack of trays 11. In this embodiment, although the number of the trays 11 is five, a desired number of trays 11 can be used.

After the connection between the cables A and A' is completed, the connecting band 22 is fitted on the connecting projections 21 on the trays 11 disposed in the stacked condition, thereby fixing the trays 11 with respect to the connecting plate 3.

When it is desired to readjust the connecting portions of the optical fibers a contained in any of the stack of trays 11 after the connection between the cables A and A' is completed, or when it is required to maintain or repair the connecting portions of the optical fibers a a prescribed period of time after the cables A and A' are connected together, such operation can be easily carried out by pivotally moving those trays 11, disposed above the tray 11 to be checked, in unison in a direction away from the tray to be checked. At this time, the portions c of the optical fibers a extending between each cable holder 4 and the receptive guide portion 14 disposed closer thereto are substantially unchanged in length even when one or more of the trays 11 are pivotally moved in its opening direction. Therefore, the portions c of the optical fibers a are not subjected to slack when the tray 11 is returned to its closed position after the required operation is finished.

As described above, since adjacent trays 11 are hingedly connected together at their one sides so as to be pivotally movable with respect to one another, the connecting portions of the optical fibers a contained in each of the trays 11 are easily accessible, which facilitates the maintenance and repair of these connecting portions. In addition, the portions c of the optical fibers a extending between the cable holder 4 and the receptive guide portion 14 are kept almost constant even when the tray 11 is pivotally moved away from and toward its adjacent tray. The portions c are not subjected to slack, which positively prevents the portions c from being formed into an arcuate shape or a loop shape having a small radius of curvature. Therefore, the transmission characteristics of the optical fibers a will not be affected by arcuate shapes caused by transmission line slack.

While the invention has been described in connection with what the applicant considers the most practical preferred embodiments, the applicant does not limit the invention to the disclosed embodiment but, on the contrary, intends the invention to cover various modifications and equivalent arrangements included within the spirit and scope of the appended claims.

What is claimed is:

1. A connecting box for connecting a plurality of optical fiber cables together, comprising:
 a plurality of container trays, each adapted to contain a surplus length of an end portion of at least one optical fiber of each of the cables, said plurality of trays being stacked one upon another, each of the trays having opposite ends and opposite lateral sides, each of the trays having a pair of receptive guide portions provided respectively at its opposite ends, adjacent to one of the lateral sides of the trays, each of the receptive guide portions being capable of receiving the optical fiber of a respective one of the cables, and adjacent trays being pivotally connected to each other about an axis extending in the direction of said one lateral side whereby the receptive guide portions of each of the trays receives the respective one of the optic fibers substantially adjacent to and in a direction parallel with the axis extending in the direction of each said lateral side.

2. A connecting box as in claim 1, wherein the adjacent trays are pivotally connected by at least one hinge.

3. A connecting box as in claim 2, wherein said hinges are releasable.

4. A connecting box according to claim 1, in which each of said plurality of trays comprises a body which includes a generally flat, elongated base portion having opposite lateral edges, and a pair of opposed side walls formed respectively on the opposite lateral edges of said base portion and disposed in generally perpendicular relation to said base portion, said tray including at least one pair of upper and lower bearing portions formed on an outer surface of one of said side walls, said upper bearing portion being disposed adjacent to an upper edge of said one side wall remote from said base portion while said lower bearing portion is disposed adjacent to a lower edge of said one side wall closer to said base portion, said upper bearing portion of a lower one of adjacent trays being disposed in alignment with said lower bearing portion of an upper one of said adjacent trays, and there being provided a pivot pin releasably fitted in the thus aligned upper and lower bearings of said adjacent trays to pivotally connect them together so that adjacent trays can be pivotally moved with respect to each other about said pivot pin which extends along the length of said one side wall.

5. A connecting box according to claim 4, in which there are provided two pairs of said upper and lower bearing members, said two pairs being spaced from each other along the length of said one side wall of said tray.

6. A connecting box according to claim 4, in which there is provided means for releasably joining said plurality of trays together in a stacked condition against pivotal movement.

7. A connecting box according to claim 6, in which said releasably joining means comprises a connecting pin formed on an outer surface of the other side wall of each of said trays, and a connecting band having a longitudinal slit therein, said pins on said trays being disposed in registry with each other in a direction of the width of said stack of trays, and said slit being releasably fitted in said connecting pins disposed in registry with one another so as to join said trays together against pivotal movement.

8. A connecting box according to claim 1, further comprising means for preventing each of said trays from pivotally moving about said axis beyond a predetermined angle.

9. A connecting box according to claim 4, in which there is provided a stop lug formed on the outer surface of said one side wall of each of said trays, adjacent to the upper edge of said one side wall, said stop lug on a lower one of adjacent trays being engageable with said one side wall of an upper one when said upper tray is pivotally moved away from said lower tray about sad pivot pin through a predetermined angle, thereby limiting pivotal movement.

* * * * *